United States Patent

Huber

[15] 3,690,198

[45] Sept. 12, 1972

[54] FAST FORWARD TAPE ADVANCE

[72] Inventor: William B. Huber, Park Forest, Ill.

[73] Assignee: Motorola, Inc., Franklin Park, Ill.

[22] Filed: Nov. 4, 1970

[21] Appl. No.: 86,791

[52] U.S. Cl. ....................................74/785, 74/190
[51] Int. Cl. ............................................F16h 3/44
[58] Field of Search ................................74/785, 190

[56] References Cited

UNITED STATES PATENTS

| | | | |
|---|---|---|---|
| 2,681,133 | 6/1954 | Kindseth et al. | 74/785 |
| 2,113,456 | 4/1938 | Stephenson | 74/785 |
| 2,399,319 | 4/1946 | Bowen et al. | 74/785 |
| 2,891,421 | 6/1959 | Grattan | 74/785 |
| 3,095,765 | 7/1963 | Perla | 74/785 |
| 3,115,791 | 12/1963 | Dean | 74/785 |
| 3,132,538 | 5/1964 | Zuppiger | 74/785 |

*Primary Examiner*—C. J. Husar
*Attorney*—Mueller & Aichele

[57] ABSTRACT

A cartridge type magnetic tape recorder has a planetary gearing mechanism for increasing the speed of rotation of the capstan shaft, to increase the speed of transport of the tape within a cartridge without increasing the speed of rotation of the associated drive motor. The planetary gearing mechanism has a sun gear secured to the capstan shaft and together with a ring gear is rotatable with the capstan shaft during normal operating conditions. By stopping rotation of the ring gear, the speed of rotation of the sun gear and, in turn, the capstan shaft, will increase to transport the tape at a faster rate.

7 Claims, 3 Drawing Figures

INVENTOR.
WILLIAM B. HUBER

BY Mueller & Aichele

ATTORNEYS.

INVENTOR.
WILLIAM B. HUBER
BY Mueller & Aichele
ATTORNEYS.

FAST FORWARD TAPE ADVANCE

BACKGROUND OF THE INVENTION

This invention relates to tape player apparatus and more particularly, to a speed changing device for a tape player which is adapted to receive a cartridge containing an endless loop of tape.

Cartridge type tape players of the type designated to operate with a cartridge containing an endless loop of tape have gained relatively wide acceptance for use as automobile tape players as well as entertainment centers in homes. The cartridge is a means of easily handling a quantity of tape and storing the tape without special containers. In many instances a cartridge, containing a quantity of endless tape, is merely inserted into an entryway of a tape player and this action thus acuates appropriate switching means to set the tape player into operation, and the removal of the cartridge will turn off the tape player as a result of deactuating the switching means.

However, one of the problems associated with this type of cartridge and tape player arrangement is the inability of the user quickly and easily to jump or advance the tape from one prerecorded selection thereon to another, or to quickly advance the tape through several such prerecorded selections to reach a desired selection which the user wants to hear. This ability of hunting along the tape is highly desirable because it allows the user of the tape cartridge to be more selective and saves much time, which is of considerable importance. Hunting, or fast forward, on this type of tape cartridge must at all times be carried on with the tape being transported only in one direction. Therefore, if the desired selection on the tape has just been passed, the complete quantity of tape in the cartridge must be transported back to the beginning of the desired, just-past, selection and, if automatic head indexing means is provided, the head position must be relocated in alignment with the proper prerecorded track.

One solution to the problem, as contemplated by the prior art, was to provide a tape player apparatus with a fast forward tape drive function which would increase the speed of rotation of the drive motor. However, such prior art attempts to provide a fast forward speed arrangement have proved inadequate in that they either require the use of a relatively expensive motor capable of running at the higher speeds without burning out, or they require the use of a complex linking system utilizing either pulleys or levers to obtain speed increase while the drive motor runs at a constant speed. However, by utilizing mechanical links and levers, the excessive acceleration from the low speed to the high speed may cause parting of the tape within the cartridge.

SUMMARY OF THE INVENTION

Accordingly, it is an object of this invention to provide an improved tape transport drive mechanism which operates at one speed to transport the tape during normal operation thereof, and at an increased speed for fast forward of the tape to provide a hunting feature.

Another object of this invention is to provide an improved tape transport drive mechanism which will rotate the capstan shaft at different speed s while a drive motor continues to rotate at substantially the same speed.

Yet another object of this invention is to provide an improved tape drive mechanism which increases the speed of tape transport under a controlled acceleration between the operating speed and the increased speed to prevent parting of the tape.

Briefly, the capstan drive and speed changing apparatus of this invention includes a planetary gearing arrangement having a sun gear connected to the capstan shaft and a flywheel driven by a drive belt or pully and which flywheel has associated therewith the planetary gearing arrangement. The drive belt is driven by a motor preferably operated at a substantially constant speed. The gearing arrangement most advantageously takes the form of a planetary gear configuration where a sun gear is fastened to the capstan shaft and several planetary gears are positioned to be in engagement with the sun gear for rotation therewith under normal speed conditions and rotatable about their independent axes fixed to the flywheel for rotation relative thereto under fast forward speed conditions. A ring gear, which has inner diameter teeth engaging the planetary gears, is positioned over the flywheel and the entire gear system, together with the flywheel and ring gears, rotate as a unit to rotate the capstan shaft for normal transport speed of the tape. A one-way clutch is interposed between the flywheel and capstan shaft so that upon energization of a clutch gear, which engages and holds the ring gear, the planetary gears will rotate about the inner diameter teeth of the ring gear and rotate the sun gear at an increased speed. The increased speed of the sun gear then, because of its direct connection with the capstan shaft, will rotate the capstan shaft at an increased speed quickly to transport the tape within the cartridge then being used. An important aspect of this invention is to control the acceleration of the tape to prevent parting or stretching thereof and to this end the clutch gear includes a torsion spring connection so that upon engagement of the clutch gear with the ring gear the torsion spring is then required to rotate gradually to decelerate the ring gear to a stopped condition which action will gradually accelerate the capstan shaft to the full fast forward speed.

DESCRIPTION OF THE PREFERRED EMBODIMENT

Figures 1, 2:
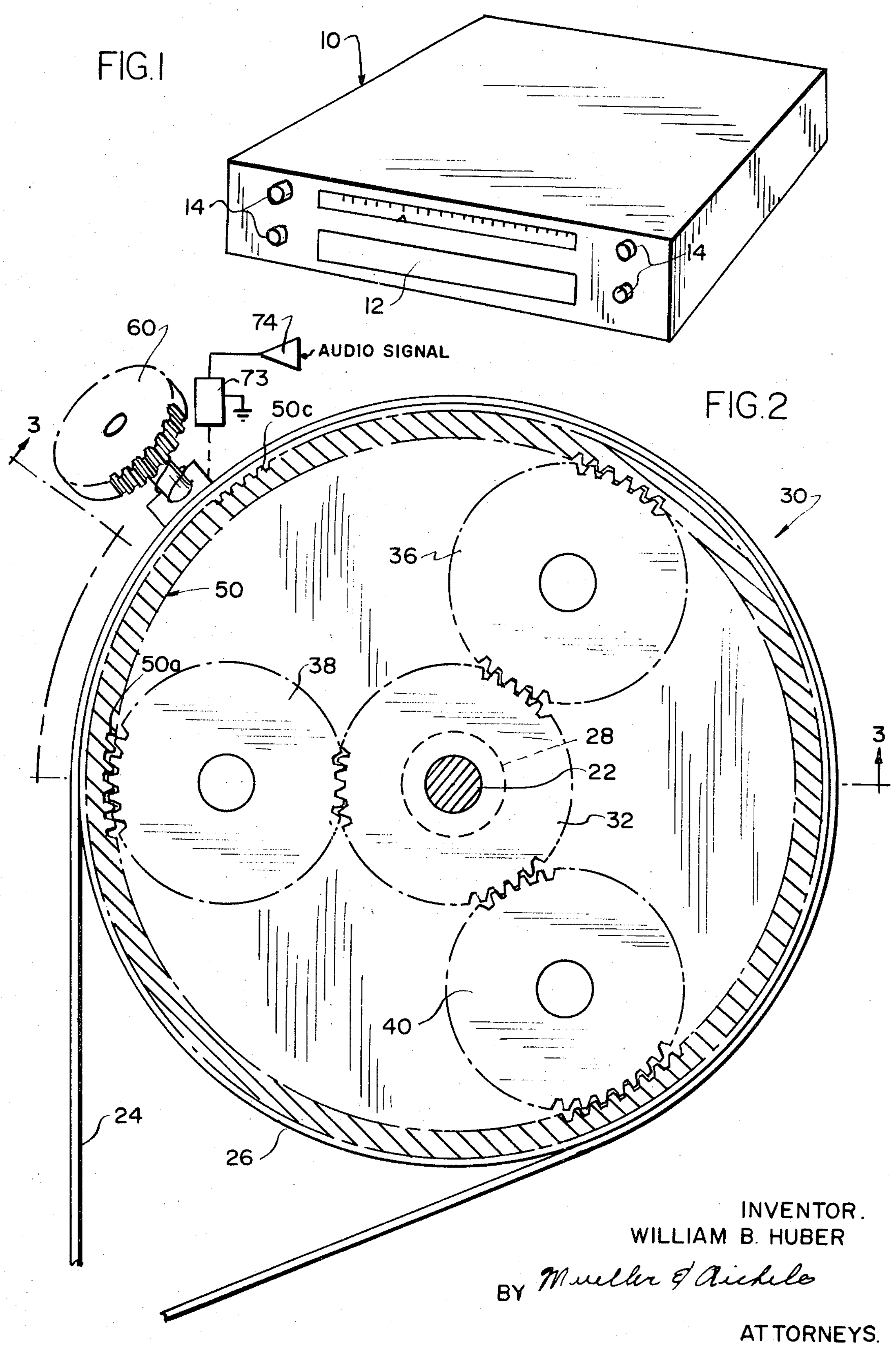
FIG. 1 is a perspective view of a cartridge type tape player wherein the capstan drive and speed changing apparatus of this invention is utilized.
FIG. 2 is an enlarged top view of a planetary gear configuration which provides the working elements of the drive and speed changing apparatus of this invention with the top portion of a ring gear cut away as indicated along line 2—2 of FIG. 3.

Referring now to FIG. 1, there is seen a tape player, designated generally by reference numeral 10, with an entry-way 12 for receiving, for example, an eight track stereo cartridge for reproducing the various musical selections already prerecorded on the tape within the cartridge. Several control knobs 14 are provided to control the various functions of the tape player, as for example, volume control, tone control, balance control between respective channels, and one control knob for quickly advancing the tape within the cartridge to a next recorded selection, i.e. hunting. When it is desired to jog or advance the tape within the cartridge rapidly to a different recorded selection, it is accomplished by increasing the speed of rotation of a capstan drive to transport the tape at a faster rate at least through the undesired portion thereof.

Figure 3:
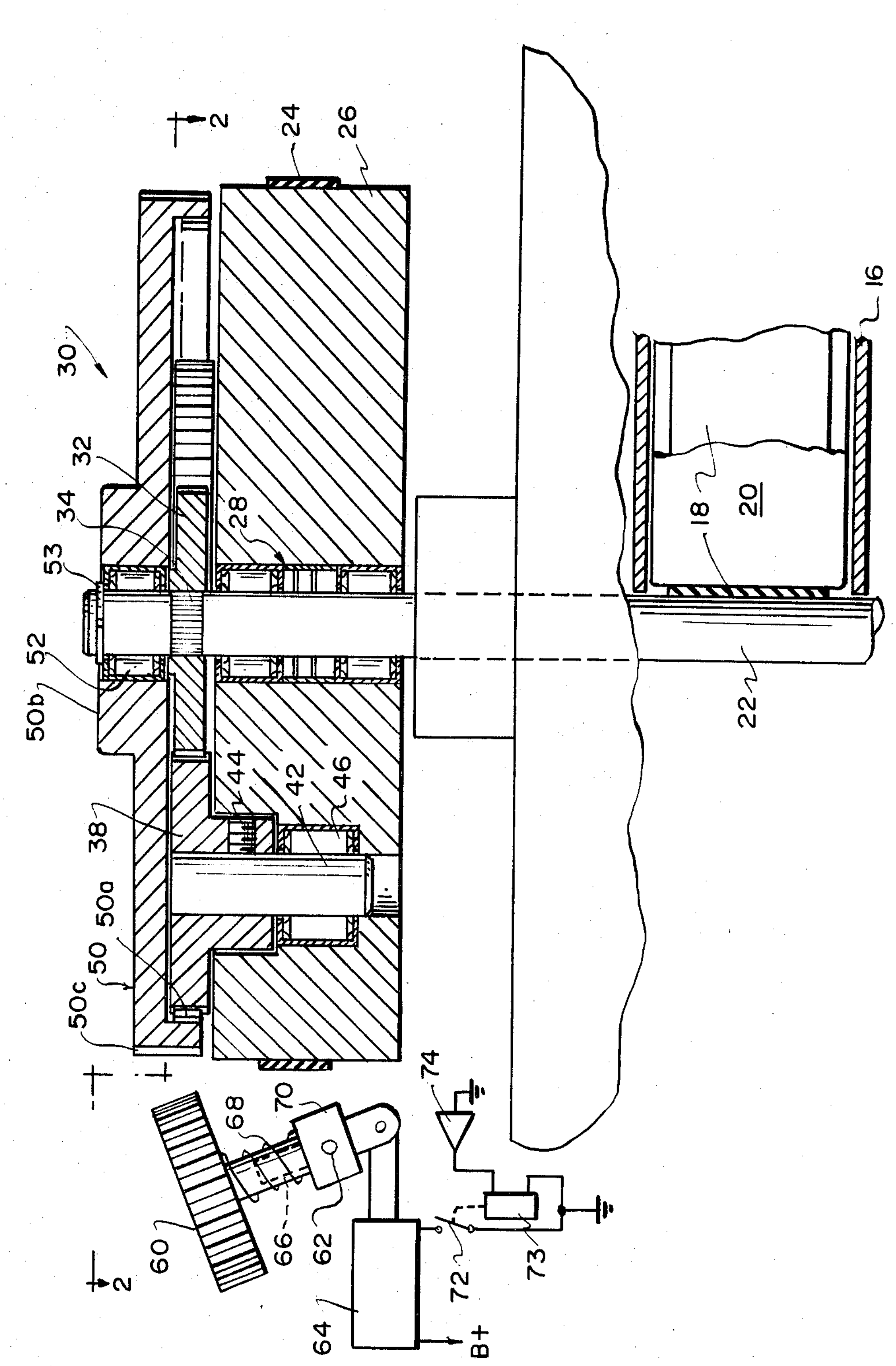
FIG. 3 is an elevated sectional view taken along line 3—3 of FIG. 2.

Referring now to FIGS. 2 and 3, there is seen the illustrated embodiment of a two-speed planetary gear arrangement constructed in accordance with this invention and arranged as a capstan drive and speed changing apparatus. In FIG. 3 a cartridge 16, of which only a fragmentary portion is shown, has an endless tape 18 therein wrapped about a drive roll 20. The drive roll 20 cooperates with a capstan drive shaft 22 to pinch the tape 18 therebetween and transport the same. To rotate the capstan drive shaft 22, a drive belt 24 partially circumscribes a flywheel 26 which is connected to the capstan drive shaft 22 by way of a one-way clutch means, such as a clutch and bearing assembly 28. The bearing assembly 28 is of standard design and configuration and may be of the type commercially available from Torrington Co., located at 6105 South Oak Park, Chicago, Ill., and similar to their drawn cap roller clutch, Part No. RC 101410. With this type of clutch, should the capstan drive shaft 22 rotate faster than the flywheel, the clutch and bearing assembly 28 will be released and no additional force will be imparted to the flywheel.

Most advantageously, a planetary gear arrangement, designated generally by reference numeral 30, is positioned at one end of the capstan drive shaft 22 and together with flywheel 26 rotate as a unit with no relative motion between the various components. However, to increase the rotational speed of the capstan drive shaft 22, the planetary gear arrangement is set into operation by overcoming the coupling forces of a one-way clutch 28 at which time the capstan drive shaft 22 will rotate at a speed which is greater than the speed of rotation of the flywheel 26.

In the embodiment illustrated herein, a first gear means, here it being a sun gear 32, is secured to the capstan drive shaft 22 by, for example, a splined portion 34 which may be a knurled segment of sufficiently large protuberances to provide a tight press fit between the parts. The sun gear is located centrally of the flywheel 26 and contacts peripheral portions of a plurality of planetary members 36, 38 and 40 which are rotatably mounted within the flywheel 26 by means of shaft and bearings, and which may be considered as a second gear means. In the case, as here illustrated, where the plurality of planetary members 36, 38 and 40 are gears, their contact with the sun gear is by engagement of the gear teeth, but where the planetary members are disc-like, their contact is by frictional pressure. The planetary gear 38, in FIG. 3, which is typical, is illustrated as being rotatably mounted to the flywheel 26 by a stub shaft 42 secured to the gear 38 by a set screw 44 and rotatable with the stub shaft 42 in a bearing 46. This arrangement is used on the other planetary gears 36 and 40, but is not seen in the sectional view of FIG. 3.

The planetary members 36, 38 and 40, hereinafter referred to as gears 36, 38 and 40, engage the inner gear portion **50*a* of a ring gear means 50 which, in turn, is rotatably secured to the capstan drive shaft 22 by a central hub portion 50*b* containing a bearing 52 and a retainer 53 about the capstan drive shaft 22. Under normal speed the ring gear 50 rotates with the capstan drive shaft 22 as a result of the coupling through the one-way clutch 28 and the fact that the planetary gears 36, 38 and 40 do not move relative to the sun gear 32. Therefore, no relative movement will occur between the inner gear portion 50*a* and the planetary gears 36, 38 and 40** engaged therewith.

Means engagable with the ring gear 50 are provided to stop rotation thereof and cause increased speed of the capstan drive shaft. To this end a pivotally movable clutch gear 60 is positioned near the outer periphery of the planetary gear arrangement 30 and is movable about a pivot point 62, which is secured to a support structure, not shown, in response to energization of a solenoid 64. Such solenoid energization will cause the clutch gear 60 quickly to move into mesh with the outer diameter teeth **50*c* of the ring gear 50. This action will controllably decelerate the ring gear 50 substantially to a stop condition which will, in turn, controllably accelerate the speed of the capstan drive shaft 22 and prevents parting or stretching of the magnetic tape then being transported. To provide this controlled deceleration of the ring gear 50, the clutch gear 60, by way of example, can be rotatably mounted on a shaft 66 for rotation about the axis thereof and a torsion means, here a coil spring 68, has one end thereof fastened to the clutch gear 60 and the other end thereof fastened to a stationary member 70 through which the pivot 62 is formed. When the clutch gear 60 engages the outer diameter teeth 50*c*, the torsion coil spring 68 will absorb energy and wind-up, or at least partially wind-up, at a predetermined rate to controllably decelerate the ring gear member 50**a as mentioned above.

The energy absorbed by the torsion spring 68 is released when the solenoid 64 is de-energized. The energy absorbed in the spring 68 is proportional to, among other things, frictional forces between the planetary gears and the ring gear during relative movement between these gears. When the clutch gear 60 is disengaged from the outer gear portion **50*c*, the momentum of the planetary gears will cause the ring gear 50 to come up to speed at a sufficient rate to again rotate with the flywheel and reduce the speed of rotation of the capstan drive shaft to that of the speed of the flywheel. The increase in speed of rotation of the ring gear is such that the capstan drive shaft is not decelerated rapidly to cause bunching or jamming of the magnetic tape 18 within the cartridge 16** as it slows down to the normal transport speed.

Upon stopping of the ring gear 50, which action does not affect rotation of the flywheel 26, the planetary gears 36, 38 and 40 will rotate relative to and because of the inside diameter teeth **50*a* in engagement therewith. This action, because of the direct gear connection, will cause relative rotation of the planetary gears with respect to the sun gear 32 which is fixedly secured to the capstan drive shaft 22. The one-way clutch 28 is then overcome, or in effect becomes disconnected, so that the capstan drive shaft 22 will rotate with the sun gear 32 which is now a much greater speed than the speed of the flywheel 26**. As long as the clutch gear 60 engages the ring gear 50, the planetary gears 36, 38 and 40 will rotate the sun gear 32 and increased capstan drive shaft speed will be the result. This increased capstan drive shaft speed will cause a corresponding increase in the rate of transport in the tape 18 so that, for example, the next selection on the tape which the user wants to hear can be quickly advanced to a listening position while all undesired selections preceding it are passed in minimum time.

By way of example, the solenoid 64 can be energized by a B+ supply and a switching device 72 which, in turn, is operated by a smaller solenoid 73 electronic switch responsive to audio signal information from an amplifier 74. This arrangement is of particular usefullness for rapid advance of tape, one song or selection at a time, and the audio signal information developed by the song or selection being quickly passed over will be the audio signal information passing through the amplifier 74. That is, the audio signal amplifier 74 maintains the switching device 72 actuated after it has been initially actuated and the absence of audio signal from the amplifier 74 automatically will open the switch 72 to stop fast transport of the tape within the cartridge.

What has been described is a simple and efficient means for providing a capstan drive and speed changing apparatus with two different speeds of rotation of a capstan drive shaft while using a drive motor having a single speed.

I claim:

1. A capstan drive and speed changing apparatus for use in a tape player including in combination:
- a capstan drive shaft for rotation at a first operating speed;
- first clutch means;
- a flywheel coupled to the capstan drive shaft through the clutch means in driving engagement therewith for rotating the capstan drive shaft at said operating speed with the flywheel being rotated at a given speed;
- first gear means secured to the capstan drive shaft for rotation therewith;
- second gear means secured to the flywheel for orbital rotation therewith and engaging the first gear means;
- ring gear means rotatable with the flywheel and engaging the second gear means for rotation therewith without relative movement therebetween; and
- variable torsion clutch means engageable with the ring gear means for gradually retarding rotation thereof until relative movement occurs between the ring gear means and the second gear means, so the second gear means rotates the first gear means thereby releasing the first clutch means to increase the speed of rotation of the capstan shaft from said operating speed to a greater speed with the speed of rotation of the flywheel remaining substantially at said given speed.

2. The capstan drive and speed changing apparatus of claim 1 wherein said first clutch means is a one-way clutch which causes rotation of said capstan shaft by said flywheel and wherein rotation of said capstan shaft faster than said flywheel will disengage said capstan shaft from said flywheel.

3. The capstan drive and speed changing apparatus of claim 1 wherein said first gear means is a sun gear secured to said capstan shaft and said second gear means are planetary gears engaged with and positioned about said sun gear and arranged to engage said ring gear.

4. The capstan drive and speed changing apparatus of claim 1 wherein said variable torsion clutch means engagable with said ring gear includes:
- a toothed clutch gear to engage teeth on said ring gear;
- solenoid means connected to said clutch gear to move the same into engagement with said ring gear; and
- torsion means connected to said clutch gear to absorb initial starting forces and provide a controlled acceleration of said capstan drive shaft.

5. The capstan drive and speed changing apparatus of claim 4 wherein said torsion means is a coil spring.

6. The capstan drive and speed changing apparatus of claim 4 further including:
- a pivotal member, said pivotal member being connected to said solenoid means for pivotal movement upon energization of said solenoid means;
- clutch receiving means on said pivotal member and arranged to receive said clutch gear perpendicular to the axis of pivotal movement thereof; and
- a torsion spring having one end thereof secured to said clutch gear and the other end secured to said pivotal member.

7. The capstan drive and speed changing apparatus of claim 6 wherein said clutch gear receiving means is a stub shaft extending from said pivotal means and said clutch gear has a hub portion receiving said stub shaft, and said torsion spring is a coil spring positioned about said stub shaft and said hub portion with one end of said coil spring secured to said clutch gear and the other end of said coil spring secured to said pivotal member, and engagement of said clutch gear with said ring gear causing torsional forces to be absorbed in said coil spring to be released upon de-energization of said solenoid.

* * * * *